United States Patent [19]

Northrop et al.

[11] Patent Number: 5,122,710

[45] Date of Patent: * Jun. 16, 1992

[54] RARE EARTH PHOSPHOR BLENDS FOR FLUORESCENT LAMP USING FOUR TO FIVE PHOSPHORS

[75] Inventors: Donald Northrop, Glen Rock; Gerald Schiazzano, Livingston, both of N.J.

[73] Assignee: Duro-Test Corporation, Fairfield, N.J.

[*] Notice: The portion of the term of this patent subsequent to Jan. 2, 2007 has been disclaimed.

[21] Appl. No.: 442,227

[22] Filed: Nov. 28, 1989

[51] Int. Cl.⁵ .................... H01J 1/62; H01J 63/04
[52] U.S. Cl. ..................... 313/487; 313/485
[58] Field of Search ............ 313/485, 486, 487, 488; 252/301.4 R, 301.4 P

[56] References Cited

U.S. PATENT DOCUMENTS

| | | | |
|---|---|---|---|
| 3,670,193 | 6/1972 | Thorington et al. | 313/487 |
| 4,199,707 | 4/1980 | Akiyama et al. | 313/487 |
| 4,296,353 | 10/1981 | Walter | 313/487 |
| 4,683,379 | 7/1987 | Wolff | 313/487 |
| 4,891,550 | 1/1990 | Northrop et al. | 313/487 |
| 4,924,141 | 5/1990 | Taubner et al. | 313/488 |

Primary Examiner—Donald J. Yusko
Assistant Examiner—John Giust
Attorney, Agent, or Firm—Darby & Darby

[57] ABSTRACT

A phosphor blend for a fluorescent lamp having four rare earth phosphors, each of which emits a narrow band of visible light energy in the visible spectrum. The color of the light produced by three of the phosphors is red, blue and green. The fourth phosphor producing light in the blue-green range improves the color rendering index of the visible light output without seriously affecting the lumen output as compared to a blend in which only the red-blue-green phosphors are used. A fifth rare earth narrow band phosphor capable of producing energy in the ultraviolet A range can be added to the blend when it is desired to simulate various phases of natural daylight. The band of ultraviolet range energy produced can be smoothed by adding to the blend another phosphor capable of producing energy in the Ultraviolet A range.

12 Claims, 1 Drawing Sheet

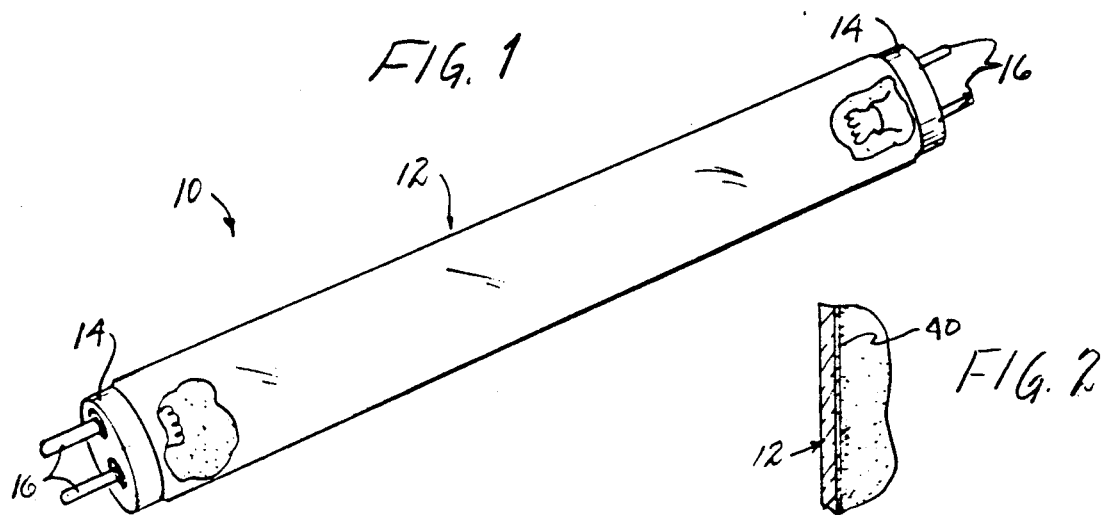
FIG. 1
FIG. 2
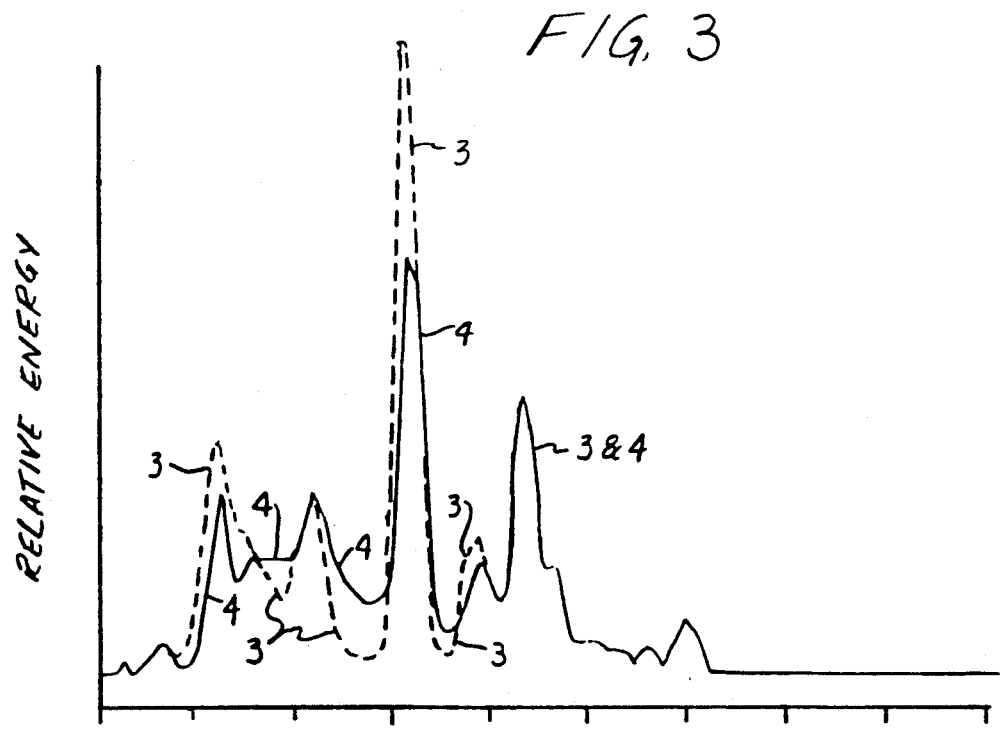
FIG. 3

RARE EARTH PHOSPHOR BLENDS FOR FLUORESCENT LAMP USING FOUR TO FIVE PHOSPHORS

BACKGROUND OF THE INVENTION

All fluorescent lamps use a phosphor blend or mix which is excited by the mercury arc stream discharge ultraviolet radiation to produce light. The typical phosphor blend comprises a variety of types of phosphors to produce the desired spectral radiation light output.

Two types of phosphor blends are currently in use. The more common one, which has been in use for a long period of time, uses a mix of so-called wide band phosphors. Each of these phosphors can produce light over a relatively wide wavelength band, for example about 60–160 nanometers, of various parts of the visible spectrum. The quantity of each of the phosphors in the blend is selected so that the desired color temperature of light is produced with desired light output, usually measured in lumens. While phosphor mixes using such wide band phosphors are effective, they generally are not as efficient in light output as narrow band phosphors.

The phosphors of a blend are also selected to produce a desired color rendering index (CRI). The higher the CRI index approaches to 100, the closer will be the color of the light to a reference color. This reference is a heated "black body" up to 5000K and phases of natural daylight above 5000K. A blend using wide band phosphors can have a relatively high color rendering index, even as high as 91–93, but with relatively low lumen output.

Another type of phosphor blend uses several of the less common but more efficient rare earth phosphors. These rare earth phosphors are more efficient than the wide band phosphors in that a blend of such rare earth phosphors can have a relatively high lumen output. Typically, they are used in a blend of three such rare earth phosphors to produce the visible light output. While the visible light output and the lumens per watt efficacy is high, the color rendering index of a typical blend of three rare earth phosphors is relatively low, usually in the range from about 73–80.

It is also sometimes desireable to produce a fluorescent lamp whose visible light and ultraviolet energy output spectrum approximates that of natural daylight for a given correlated color temperature. Such a lamp is disclosed in U.S. Pat. No. 3,670,193, Thorington, et al., which is assigned to the same assignee as this application. The phosphor blend of that lamp relies upon wide band phosphors for producing the visible light output. Another phosphor is added to the blend to produce energy in the ultraviolet range so that the total radiated spectrum output of the lamp in both the visible and ultraviolet range simulates natural daylight at a given correlated color temperature.

In the copending application, Ser. No. 108,895, filed Oct. 15, 1987 entitled PHOSPHOR BLEND FOR BROAD SPECTRUM FLUORESCENT LAMP, abandoned in favor of continuation application Ser. No. 346,317, filed May 1, 1989, now U.S Pat. No. 4,891,550 granted Jan. 2, 1990, which is also assigned to the same assignee, a phosphor blend for fluorescent lamps is disclosed which uses a combination of wide band phosphors and narrow band rare earth phosphors. By suitably selecting the combination of narrow band rare earth and wide band phosphors, the lumen output and color rendering index can be controlled. The general principles disclosed are that the phosphor blend components are selected so that as the lumen output of the lamp increases, the color rendering index decreases, and vice versa. Lamps according to the teachings of that application also can have a suitable ultraviolet energy emitting phosphor in the blend so that the overall spectrum of the lamp can approach that of natural daylight as in the aforesaid Thorington et al. patent.

The blends using three of the more efficient rare earth phosphors leave gaps in their spectrum of visible light output. These gaps account for a lower color rendering index for usually higher lumen output compared to blends using the less efficient wide band phosphors. That is, since there are gaps in the overall color spectrum, a high CRI cannot be achieved.

BRIEF DESCRIPTION OF THE PRESENT INVENTION

The present invention relates to a phosphor blend for fluorescent lamps using rare earth narrow band phosphors which substantially increases the light output compared to a blend using wide band phosphors. At the same time, the blend of rare earth phosphors maintains a relatively high color rendering index substantially equivalent to that produced by the blend of wide band phosphors. In accordance with the invention, there is added to a typical tri-blend of rare earth phosphors, the three phosphors usually having output energy peaks in the blue (453 nm), green (541 nm) and red (611 nm) color ranges, a fourth rare earth phosphor with a peak wavelength at about 480 nm, i.e. a blue/green color. By adding this fourth narrow band rare earth phosphor, the color rendering index of the lamp is increased as compared to a lamp using a standard tri-phosphor rare earth blend and high lumen output is maintained.

In addition, an amount of an ultraviolet emitting phosphor can be added to the blend to produce an output spectrum similar in ratio to the IEC standard for natural sun and skylight. A second phosphor type producing ultraviolet energy also can be utilized so that the spectral energy output in the ultraviolet range is made more uniform for various natural phases of daylight.

OBJECTS OF THE INVENTION

An object of the invention is to provide an improved phosphor blend for a fluorescent lamp using rare earth, narrow band phosphors.

A further object is to provide an improved phosphor blend for fluorescent lamps using rare earth phosphors which have a high color rendering index and a lumen output substantially better than a lamp using a phosphor blend of wide band phosphors with a light output only somewhat less than that of a phosphor blend using only three rare earth phosphors.

Yet another object is to provide an improved phosphor blend for a fluorescent lamp using a plurality of rare earth phosphors each of which produces a narrow band wavelength of light energy including at least one narrow band phosphor for producing ultraviolet energy so that a wide spectrum of radiated energy output can be obtained.

BRIEF DESCRIPTION OF THE DRAWINGS

Other objects and advantages, of the present invention will become more apparent upon reference to the following specification and annexed drawings in which:

FIG. 1 is a perspective view of the fluorescent lamp;

FIG. 2 is a fragmentary view of the portion of the lamp showing the phosphor blend thereon; and FIG. 3 is a graph showing the spectral radiation characteristics of the components of one phosphor blend according to the invention.

DETAILED DESCRIPTION OF THE INVENTION

Referring to FIGS. 1 and 2, the mechanical and electrical components of the fluorescent lamp 10 of the invention are of conventional construction. It includes the usual tubular outer glass envelope 12 made of any conventional glass.

At each end of the envelope is a base 14. The base illustratively has a pair of pins 16 for connection to the terminals of a lamp fixture (not shown) which provides the electrical energy to the lamp. Connected to the pins 16 at each end and internal of the envelope is a suitable filament cathode 18 of any conventional type. The lamp also contains a quantity of mercury vapor which is ionized upon application of electrical current to the two filament cathodes. One or both of the bases also has a tubulation (not shown) through which the envelope can be exhausted and the mercury vapor and starting gas added.

The heretofore described mechanical and electrical aspects of the lamp are conventional. The invention comprises a novel phosphor blend 40 which is applied to the internal wall of the envelope 12 in any conventional manner.

Typically, a variety of common narrow band phosphors are used in a tri-band blend of narrow band rare earth phosphors. These include a narrow band phosphor in each of the blue, green and red ranges. Each of these phosphors produces light output over a relatively narrow band, for example, from 10 to about 40 nanometers. Such a blend of three narrow band phosphors achieves a relatively high lumen output. However, the color rendering index is relatively low.

If the spectrum of the three narrow band phosphors conventionally used in a tri-band mix is plotted out, as shown in FIG. 3, there would be a gap in the color range between green and blue. The present invention adds to the tri-blend a fourth narrow band phosphor which is to be selected in the blue-green range. This is also shown in FIG. 3. As seen, the peak of the added blue-green rare earth phosphor is at about 480 nm.

A preferred blend of the four narrow band phosphors used in the present invention is:

EXAMPLE 1

| | Phosphor Component | Weight Percentage |
|---|---|---|
| 1. | Blue (Strontium Calcium Barium Chlorophosphate Europium Activated) $(Sr, Ca, Ba)_5 (PO_4)_3, Cl:Eu$ Peak Wavelength 453 nm | 9% |
| 2. | Green (Cerium Terbium Magnesium Aluminate) $(Ce, Tb) Mg Al_{11} O_{19}$) Peak Wavelength 541 nm | 20% |
| 3. | Red (Yitrium Oxide: Europium) $Y_2O_3:Eu$ Peak Wavelength 611 nm | 34% |
| 4. | Blue/Green (Strontium borophosphate Europium Activated) $12(Sr, Eu) O (B_2O_3)5P_2O_5$ U.S. Pat. No. 4.174,294 (1979) Peak Wavelength 480 nm | 37% |

The phosphor blend of Example 1 produces light in the visible spectrum. Where it is desired to produce a full spectrum lamp, that is, one which produces energy corresponding to natural daylight or skylight, a fifth narrow band phosphor which emits ultraviolet energy in the UV-A range can be added to the blend of Example 1. The UV-A producing phosphor has a bandwidth of about 40 nm and is added to the blend of Example 1 to produce the full spectrum blend, Example 2. This phosphor can be, for example:

| | Phosphor Component | Weight Percentage |
|---|---|---|
| 5. | Ultraviolet Ce(Barium, Magnesium) Aluminate: Cerium for Ultraviolet Balance Peak Wavelength 351 nm | 16% |

The blend of Example 2, using phosphors 1.–4. of Example 1 has the following weight percentages of the phosphors:

EXAMPLE 2

| Component No. | Percentage |
|---|---|
| 1. | 8% |
| 2. | 17 |
| 3. | 29 |
| 4. | 32 |
| 5. | 14 |

Another narrow band phosphor to produce the UVA energy is $SrB_4O_7 (F):Eu$. This would form Component 5 of the blend of Example 2.

A second ultraviolet phosphor emitting energy in the UV-A range also can be used to smooth out the energy emission in this range. This second narrow band UV-A producing phosphor can be, for example, $Ce(MgBa)Al_{11}O_{19}:Ce$. The narrow band phosphor has a peak wavelength of about 371 nm. The amount of this second narrow band phosphor added depends upon the total amount of UV energy that is desired to be produced from the lamp. Normally, the amount of the two UV-A phosphors would be adjusted so that the same quantity of Ultraviolet A energy is produced as in the blend of Example 2.

The phosphor blends of Examples 1 and 2 have the improve lumen output and CRI characteristics. The chart set forth below compares the lumen output and color rendering index of the wide band phosphor blend and the blends of the three (prior art) and four narrow band phosphors.

| Phosphor Types | Only Visible Initial Light Lumens | CRI | Natural Sun and Sky Light with UV Initial Lumens | CRI |
|---|---|---|---|---|
| Wide Band Phosphor | 2200 | 90+ | 2175 | 90− |
| Narrow Tri-Phosphors | 3200 | 73–80 | 3100 | 73–80 |

| Phosphor Types | Only Visible Initial Light Lumens | CRI | Natural Sun and Sky Light with UV Initial Lumens | CRI |
| --- | --- | --- | --- | --- |
| Narrow Quad-Phosphors | 2925 | 90– | 2800 | 90– |

FIG. 3 shows a comparison of the radiation spectrum of the tri-band prior art narrow band phosphor blend and the quad-band phosphor blend of the subject invention. The figure shows the increase in energy output of the four (4) component narrow band phosphor blend versus three (3) component narrow band phosphor blend by the crosshatched area and the decrease by the diagonal hatching. As can be seen, the four component narrow band phosphor blend fills in gaps in the spectrum and also lowers the green and blue narrow band peaks which results in a much smoother curve and a higher CRI.

As seen, a novel improved phosphor blend is provided using rare earth narrow band phosphors. The blend provides good lumen output with a high CRI.

What is claimed is:

1. A fluorescent lamp comprising:
   an envelope having a filament cathode at each end thereof, a quantity of an ionizable material in the envelope, and a phosphor blend on the inner wall surface of the envelope, said phosphor blend comprising the following rare earth phosphors: (a) (Sr, Ca Ba)$_5$ (PO$_4$)$_3$, Cl:Eu, (b) (Ce, Tb) Mg Al$_{11}$ O$_{19}$, (c) Y$_2$O$_3$:Eu, (d) 12(Sr, Eu) O (B$_2$O$_3$)5P$_2$O$_5$.

2. A fluorescent lamp as in claim 1 wherein said four phosphors respectively have a peak wavelength of about 453 nm, 541 nm, 611 and 480 nm.

3. A fluorescent lamp as in claim 1 wherein said phosphors of the blend have, respectively, the following weight percentages:
   (a) 9%, (b) 20%, (c) 34%, (d) 37%.

4. A fluorescent lamp as in claim 1, further comprising a fifth narrow band phosphor for producing energy in the UV-A range so that the phosphor blend produces a correlated color temperature in the range of at least one phase of natural daylight.

5. A fluorescent lamp as in claim 4 wherein said fifth phosphor produces ultraviolet energy of a relatively narrow bandwidth in the range of from about 10 to about 40 nm.

6. A fluorescent lamp as in claim 4 wherein said fifth phosphor has a peak wavelength of about 344 nm.

7. A fluorescent lamp as in claim 5 wherein said fifth phosphor of the blend is SrB$_4$O$_7$ (F):Eu.

8. A fluorescent lamp as in claim 7 wherein the phosphors of the blend comprise: (a) (Sr, Ca Ba)$_5$ (PO$_4$)$_3$, Cl:Eu, (b) (Ce, Tb) Mg Al$_{11}$ O$_{19}$, (c) Y$_2$O$_3$:Eu, (d) 12(Sr, Eu) O (B$_2$O$_3$)5P$_2$O$_5$, (e) SrB$_4$O$_7$(F):Eu.

9. A fluorescent lamp as in claim 8 wherein said phosphors have, respectively, the following weight percentages: (a) 8%, (b) 17%, (c) 29%, (d) 32%, (e) 14%.

10. A fluorescent lamp as in claim 1, further comprising at least two narrow band phosphors for producing energy in the ultraviolet A range.

11. A fluorescent lamp as in claim 10, wherein the said narrow band phosphors for producing energy in the ultraviolet A range have a peak respectively at about 344 nm and about 371 nm.

12. A fluorescent lamp as in claim 11, wherein the phosphors are:
   Sr B$_4$ O$_7$(F):Eu
   Ce(MgBa)Al$_{11}$ O$_{19}$:Ce

* * * * *